United States Patent [19]

Wiegand

[11] Patent Number: 4,933,677
[45] Date of Patent: Jun. 12, 1990

[54] SPUR REDUCTION SYSTEM FOR DIGITAL RF MEMORY

[75] Inventor: Richard J. Wiegand, Severna Park, Md.

[73] Assignee: Westinghouse Electric Corp., Pittsburgh, Pa.

[21] Appl. No.: 288,377

[22] Filed: Dec. 22, 1988

[51] Int. Cl.$^5$ ............................................. G01S 7/38
[52] U.S. Cl. .................................. 342/14; 342/15
[58] Field of Search .................. 342/13, 14, 15; 455/1

[56] References Cited

U.S. PATENT DOCUMENTS

| | | |
|---|---|---|
| 3,015,096 | 12/1961 | Deloraine et al. |
| 3,225,300 | 12/1965 | Barney et al. |
| 3,564,546 | 2/1971 | Barney et al. |
| 3,891,989 | 6/1975 | Barney et al. ........................ 342/15 |
| 3,971,021 | 7/1976 | Cann ................................... 342/15 |
| 4,017,856 | 4/1977 | Wiegand .............................. 342/15 |
| 4,056,788 | 11/1977 | Brown et al. ...................... 342/14 X |
| 4,090,196 | 5/1978 | Stevenson, Jr. ..................... 342/15 |
| 4,145,691 | 3/1979 | Freeling et al. ..................... 342/15 |
| 4,247,946 | 1/1981 | Mawhinney ........................... 455/1 |
| 4,328,496 | 5/1982 | White ................................... 342/15 |
| 4,338,528 | 7/1982 | Wolkstein ........................... 307/511 |
| 4,633,516 | 12/1986 | Tsui ................................... 455/226 |
| 4,682,172 | 7/1987 | Kuhrdt ............................... 342/15 |
| 4,713,662 | 12/1987 | Wiegand ............................. 342/13 |
| 4,743,905 | 5/1988 | Wiegand ............................. 342/14 |

OTHER PUBLICATIONS

Millman, J., "Microelectronics", 1979, pp. 335-341, 533-535, and 592-596.

Primary Examiner—Thomas H. Tarcza
Assistant Examiner—John B. Sotomayor
Attorney, Agent, or Firm—W. G. Sutcliff

[57] ABSTRACT

A coherent radio frequency memory (CRFM) which employs a digital RF memory (DRFM) and a power limiter at its input for limiting the power of the RF input to a relatively constant level over a broad range of such inputs. In addition, a RF noise generating means is coupled to the input of the DRFM at the optimum level for providing random noise for decorrelating spurious outputs of the DRFM.

11 Claims, 2 Drawing Sheets

SPUR REDUCTION SYSTEM FOR DIGITAL RF MEMORY

BACKGROUND OF THE INVENTION

The invention relates, in general, to coherent radio frequency memories (CRFM) and, more specifically, to digital radio frequency memories (DRFM) suitable for use in military radar countermeasure equipment.

Active radar jammers are used in the field of electronic countermeasures to confuse or counter a system originating radar signals. In some situations, it is desirable to return signals to the radar system which are exact copies of the arriving radar signal. In other situations, it is desirable to return signals to the radar system which have characteristics other than that of the received radar signal in order to further confuse the radar system. In any event, it is usually necessary for the countermeasure system to store the received radar signal and to reproduce it at a later time.

Previously, delay lines of various types have been used effectively to store the received radar signal for a short period of time and make the stored radar signal available at a later time. One of the disadvantages of delay lines is that the delay cannot be electronically changed easily. Also, it is difficult to obtain reasonably long delay periods without serious signal degradation. Also, delay lines are usually large and bulky.

An improvement over the delay line technology has been achieved by the use of digital radio frequency memories (DRFMs) which convert relatively high radio frequency (RF) signals down to a low intermediate frequency (IF) frequency by mixing the RF with a local oscillator (LO) signal. The IF signal is then digitized for storage in a digital memory device. The digital memory can be controlled in a manner similar to that of a digital memory of a computer and the stored value representing the radar signal can be recalled and replicated at any time delay desired. Further, the manipulation of the digital values to produce changes in the replicated signal are also conveniently done by the digital process.

U.S. Pat. No. 4,713,662 entitled Modulated Digital Radio Frequency Memory, in the name of Richard J. Wiegand, the inventor herein, and assigned to Westinghouse Electric Corporation, the assignee herein, discloses a variety of DRFMs including a two-channel or I&Q system as well as a modulated single channel DRFM. The I&Q or two-channel DRFM stores an RF pulse by preserving the frequency and phase of an RF input local oscillator and a sampling clock while the remainder of information is held in digital logic chips such as a RAM. In the modulated single channel DRFM in addition to preserving frequency and phase of the RF local oscillator signal, a modulation pattern for the RF local oscillator is preserved and applied to the input and output.

The DRFMs described in Wiegand's patent employ one bit sampling, that is, the IF input is sampled to determine if the signal is positive or negative at each sample point. One bit sampling reduces RAM size to a minimum while allowing maximum sampling frequency and maximum amplitude dynamic range. However, the stored DRFM signal is quite non-linear resulting in numerous spectral lines or spurs in addition to the main desired coherent spectral lines. Also, an image of the input may be generated which is undesirable. While various techniques are available to significantly reduce spurs in both the I&Q and single channel DRFMs further improvement is desirable.

SUMMARY OF THE INVENTION

The present invention reduces spurious spectral lines or spurs in I&Q and single channel DRFMs by employing a limiting preamplifier at the DRFM input, and by injecting an appropriate noise level. The invention is directed to a coherent radio frequency memory (CRFM) that includes a DRFM system in which a radio frequency (RF) input pulse is mixed with a local oscillator signal (LO) to produce an intermediate frequency signal (IF). The IF is converted to digital form for retrievable storage in a digital memory. The digital signal may be reconverted to analog and mixed with the local oscillator signal to replicate the RF input signal. If the DRFM system is a single channel DRFM system the local oscillator may be modulated with a wave form which is stored and replicated at the same time that the RF pulse is replicated at the output. Modulation of the LO signal further eliminates the image and the undesirable spurs. In a two-channel DRFM system, the image is cancelled at the output by combining the I&Q channels 180° out of phase. In either case a limiting amplifier is placed upstream of the DRFM input. The limiting amplifier enhances the dynamic range of the CRFM by limiting the input power of the RF input signal to a relatively constant value over a broad range of such RF inputs. Thus, the DRFM operates at an optimum level. An adjustable RF noise source is superimposed on the output of the limiting amplifier which serves to reduce spur levels. The RF noise source serves to modulate the RF signal prior to mixing with the local oscillator signal. Modulation of the local oscillator signal causes spurs, including the image, to decorrelate. Amplifier noise which is random causes very efficient decorrelation of the spurs and yet preserves the RF input. In another embodiment a negative feedback circuit provides both voltage limiting of the RF input and noise.

DESCRIPTION OF THE INVENTION

Figure 1:
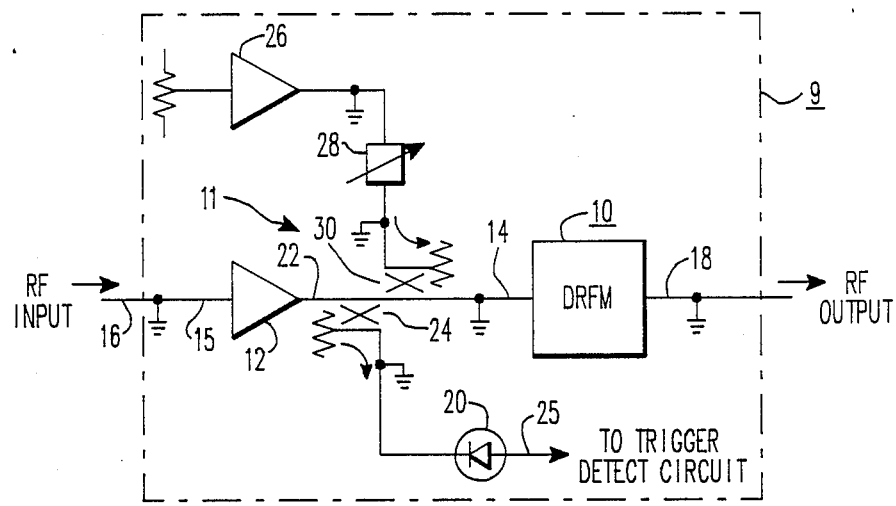
FIG. 1 is a block diagram of an embodiment of the present invention featuring a DRFM with a RF limiting amplifier and an adjustable noise source coupled to the input thereof.

FIG. 1 illustrates in schematic block form, a coherent radio frequency memory 9 (CRFM) including a DRFM 10 and a spur reduction circuit 11 of the present invention. In FIG. 1 the DRFM 10 may be a single or dual channel system as set forth in the Wiegand Patent 4,713,662. The spur reduction circuit 11 includes a limiting amplifier 12 coupled to the input 14 of the DRFM 10. The RF input 16 feeds the limiting amplifier 12. The power of the RF input 16 of the limiting amplifier 12 may vary over a wide range of values. Accordingly, the limiting amplifier 12 is provided in order to attenuate or limit the amount of RF input power appearing at the input 14 of the DRFM. By limiting the RF input power, the DRFM 10 can operate in a narrow optimum range and hence provide for better performance, including better spur reduction.

It is well known that DRFMs employ analog-to-digital (A/D) and digital-to-analog (D/A) converters (not shown). The limiting amplifier 12 by providing a constant power input to the DRFM 10 at an optimum level allows the A/D and D/A converters therein (not shown) to operate at their best speed, sensitivity and accuracy.

In accordance with known DRFM techniques, the RF output 18 which is an approximation of the RF input 16 is provided at a programmed later time. A detector 20 in the form of a crystal diode is coupled to the output 22 of the limiting amplifier 12 by means of a coupler 24. Upon the occurrence of the RF input 16, the detector 20 provides an output 25 to a trigger detect circuit (not shown) which activates the DRFM 10.

In accordance with the present invention, an adjustable noise source in the form of an amplifier 26 and an adjustable attenuator 28 is provided. The output of the attenuator 28 is connected to the input 14 of the DRFM by means of a coupler 30. The amplifier 26 produces random noise, the amplitude of which may be adjusted to some optimum value by means of the attenuator 28. Noise provided by the amplifier 26 is superimposed on the output 22 of the limiting amplifier 12 at the DRFM 10 input 14. The noise is truly random and will effectively decorrelate the spurs produced in the DRFM 10, especially when one bit sampling is used.

Figure 3A:
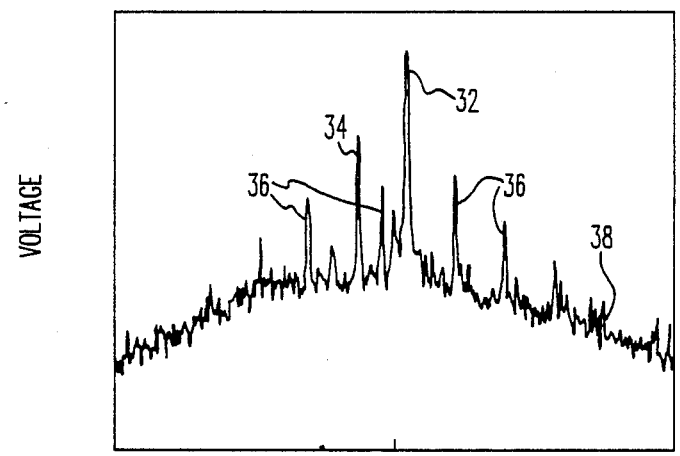
FIG. 3A is an illustration of the output spectrum of a DRFM which exhibits multiple spurs.

FIG. 3A is a graphical representation of the output spectrum of the DRFM illustrated in FIG. 1 but without input power limiting. In FIG. 3A the amplifier 12 is operating at a relatively high power and the desired output appears at the peak 32. The image is peak 34 and the remaining peaks 36 are spurs.

Figure 2:
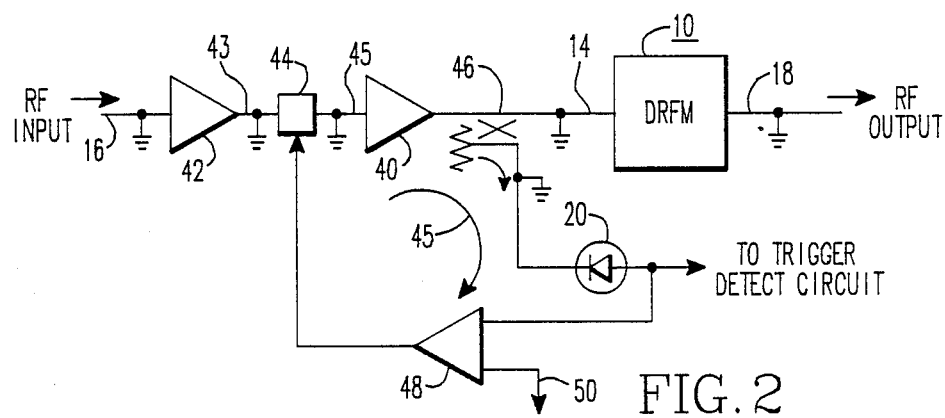
FIG. 2 illustrates another embodiment of the present invention in which a feedback circuit provides automatic gain control and noise at the input of the DRFM.
Figure 3B:
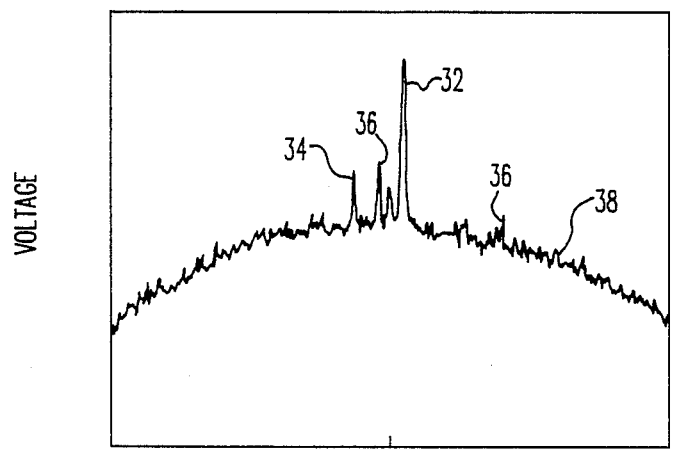
FIG. 3B illustrates the output spectrum of the DRFM of FIG. 3A employing an embodiment of the present invention.

As a test of the principles of the invention, as the RF signal input power is lowered to achieve the same signal to noise ratio that is intended to occur in FIG. 1, the output spectrum improves. In FIG. 3B the desired output peak 32 is reduced only slightly as a result of limiting the input power by means of the limiting amplifier 12. The image peak 34 and the spurs 36 are significantly reduced, as shown. In some cases the spurs meet the noise floor 38. FIG. 2 illustrates another embodiment of the present invention in which the DRFM 10 receives an amplifier signal at input 14. The RF input 16 is coupled to RF amplifier 42 which is coupled at its output 43 to the input of a variable voltage attenuator 44. Its output 45 is input to amplifier 40. A feedback loop 45 couples the output 46 of the amplifier 40 to the variable voltage attenuator 44 via a high speed servo video amplifier 48 and crystal detector 20. The RF input to DRFM 10 is detected by means of the detector 20 and triggering circuit (not shown) in the feedback loop 45. The amplifier 48 provides negative feedback for increasing the attenuation of the variable voltage attenuator 44 in order to reduce power of the input signal to the amplifier 40. In the configuration illustrated in FIG. 2 the high speed servo amplifier 48 provides automatic-gain-control (AGC) so that the signal-to-noise (S/N) ratio remains optimum. In the embodiment of FIG. 2, RF limiting is obtained by RF amplifier 42 and RF noise is obtained from the RF amplifier 40. The video amplifier 48 has an automatic gain control (AGC) bias lead 50 which may be adjusted to optimize or trim the circuit for optimum signal-to-noise ratio.

The present invention provides for reduced spur levels relative to the desired signal using a standard DRFM without significant modification. The present invention deliberately injects RF noise into the DRFM input along with the signal which helps to decorrelate the spurs. The spur suppression may be optimized by trimming the gain of the input circuit.

Figure 4:
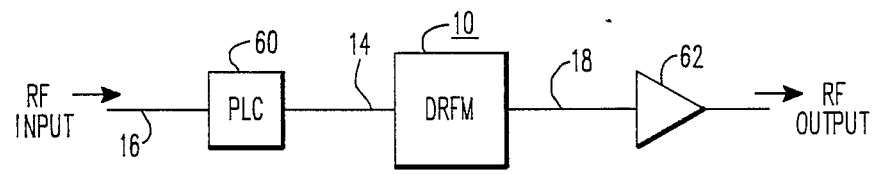
FIG. 4 is another embodiment of the present invention illustrating a limiting amplifier at the DRFM output.

In yet another embodiment of the present invention illustrated in FIG. 4, the DRFM 10 has a power limiting circuit (PLC) 60 at the input 14 thereof and, in addition, provides for a limiting amplifier 62 or the like at the output 18. In the arrangement of FIG. 4 the second limiting amplifier 62 on the DRFM output may serve to further suppress spurs. In addition, so called hard driving or driving the limiting amplifier 62 to saturation at a high level may also result in a better signal capture phenomena, which is a tendency of such limiting amplifier to suppress the weaker of two signals within the pass band. This also will reduce unwanted intermodulation (IM) products caused by the presence of a weak signal. Accordingly, the amplified strong replica of the RF input tends to be received by the radar source (not shown), thereby enhancing the countermeasures effect of the system.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed:

1. A coherent radio frequency memory (CRFM) for replicating an RF input signal in a manner suitable for use in a military electronic countermeasures system comprising:
   a digital radio frequency memory (DRFM), said DRFM including an input for receiving the RF input and an output for producing a replica of the RF input at a later time; and
   power limiting means at the input of the DRFM for limiting the power of the RF input to a selected level, and noise generating means coupled to the input of the DRFM.

2. The CRFM of claim 1, wherein the noise source includes adjustable attenuator means for varying the level of the noise at the input of the DRFM.

3. The CRFM of claim 1, wherein the power limiting means includes a saturable limiting amplifier.

4. The CRFM of claim 1, wherein the power limiting means includes an amplifier for amplifying the RF input and a feedback loop including a servo amplifier and a variable voltage attenuator coupled to the amplifier input for providing negative feedback to the amplifier to thereby limit the input power of the RF signal to the optimum signal to noise ratio.

5. The CRFM of claim 1, wherein the noise generating means includes an RF amplifier.

6. The CRFM of claim 1, wherein the power limiting means comprises an amplifier.

7. The CRFM of claim 1, further comprising an output power limiting means for amplifying the output of said DRFM.

8. The CRFM of claim 7, wherein said output power limiting means comprises an output power amplifier, said output power amplifier being driven to saturation.

9. The CRFM of claim 1, wherein said power limiting means comprises a limiting amplifier, said limiting amplifier controlling the amplitude of the RF input and enhancing the noise floor of the DRFM to thereby obscure spurious signals.

10. The CRFM of claim 1, wherein the noise generating means comprises an amplifier having an output coupled to the DRFM input for superimposing the noise on the RF input.

11. The CRFM of claim 10, wherein the noise produced by said noise generating means is in the RF domain for decorrelating spurious outputs of the DRFM.

* * * * *